US007000248B2

(12) United States Patent
Mizukoshi

(10) Patent No.: US 7,000,248 B2
(45) Date of Patent: Feb. 14, 2006

(54) VIRTUAL NETWORK AND VIRTUAL NETWORK CONNECTION SYSTEM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 742 days.

(21) Appl. No.: 09/985,038

(22) Filed: Nov. 1, 2001

(65) Prior Publication Data

US 2002/0053034 A1    May 2, 2002

(30) Foreign Application Priority Data

Nov. 1, 2000    (JP) ............................ 2000-334053

(51) Int. Cl.
  G06F 11/30    (2006.01)
  G06F 12/14    (2006.01)
  H04L 9/00     (2006.01)
  H04L 9/32     (2006.01)
(52) U.S. Cl. .............................. 726/11; 726/15; 726/12
(58) Field of Classification Search ................ 713/200, 713/201, 153, 154; 726/15, 12, 11
  See application file for complete search history.

(56) References Cited

U.S. PATENT DOCUMENTS 5,526,376 A * 6/1996 Kellenberger et al. ...... 375/211
5,898,838 A * 4/1999 Wagner ........................ 709/224
6,158,008 A * 12/2000 Maria et al. ................. 713/201

FOREIGN PATENT DOCUMENTS

| CA | 2156015 | * | 2/1997 |
| JP | A 09-270803 | | 10/1997 |
| JP | A 10-126440 | | 5/1998 |
| JP | 11-234270 | | 8/1999 |
| JP | A 11-219326 | | 8/1999 |
| JP | 2000-115167 | | 4/2000 |
| JP | A 2000-125062 | | 4/2000 |
| JP | A 2000-132473 | | 5/2000 |

* cited by examiner

Primary Examiner—Gilberto Barron
Assistant Examiner—Venkat Perungavoor

(74) Attorney, Agent, or Firm—Young & Thompson

(57) ABSTRACT

A virtual network of the present invention includes an external network including a repeat server, and a first and a second private network each including a respective firewall that is connectable only to the repeat server. The first and second private networks respectively further include a first and a second router configured to report respective destinations of data to the repeat server for interchanging data with each other. The repeat server repeats, in accordance with the destinations reported, data received from the first router to the second router and repeats data received from the second router to the first router. A virtual network connection system is also disclosed.

8 Claims, 3 Drawing Sheets

VIRTUAL NETWORK AND VIRTUAL NETWORK CONNECTION SYSTEM

BACKGROUND OF THE INVENTION

1. Field of the Invention

The present invention relates to a virtual network and a virtual network connection system and more particularly to a virtual network with enhanced security using, e.g., a firewall.

2. Description of the Background Art

A firewall or similar security measure has customarily been applied to an intranet or similar private network in order to obviate illicit accesses via Internet in the event of connection of the private network to Internet. A network generally referred to as an extranet is available for connecting networks each including a respective firewall, i.e., for connecting a plurality of intranets via Internet. Typical of extranets is a VPN (Virtual Private Network) that dynamically forms a work group within a company or over a plurality of companies. More specifically, the VPN allows various applications in different intranets, which belong to the same work group, to be linked together via Internet or basic network.

To finely configure private networks organization by Organization, Web Service or similar particular service is available. However, the conventional networks do not allow organizations to communicate with each other. Moreover, the VPN system or similar extranet is expensive and prevents a virtual network from being flexibly constructed.

Technologies relating to the present invention are disclosed in, e.g., Japanese Patent Laid-Open Publication Nos. 9-270803. 10-126440, 11-219326, 2000-125062 and 2000-132473.

SUMMARY OF THE INVENTION

It is an object of the present invention to provide a virtual network capable of easily constructing a virtual network by connecting existing private networks at low cost, and a virtual network connection system.

A virtual network of the present invention includes an external network including a repeat server, and a first and a second private network each including a respective firewall that is connectable only to the repeat server. The first and second private networks respectively further include a first and a second router configured to report respective destinations of data to the repeat server for interchanging data with each other. The repeat server repeats, in accordance with the destinations reported, data received from the first router to the second router and repeats data received from the second router to the first router.

A virtual network connection system is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
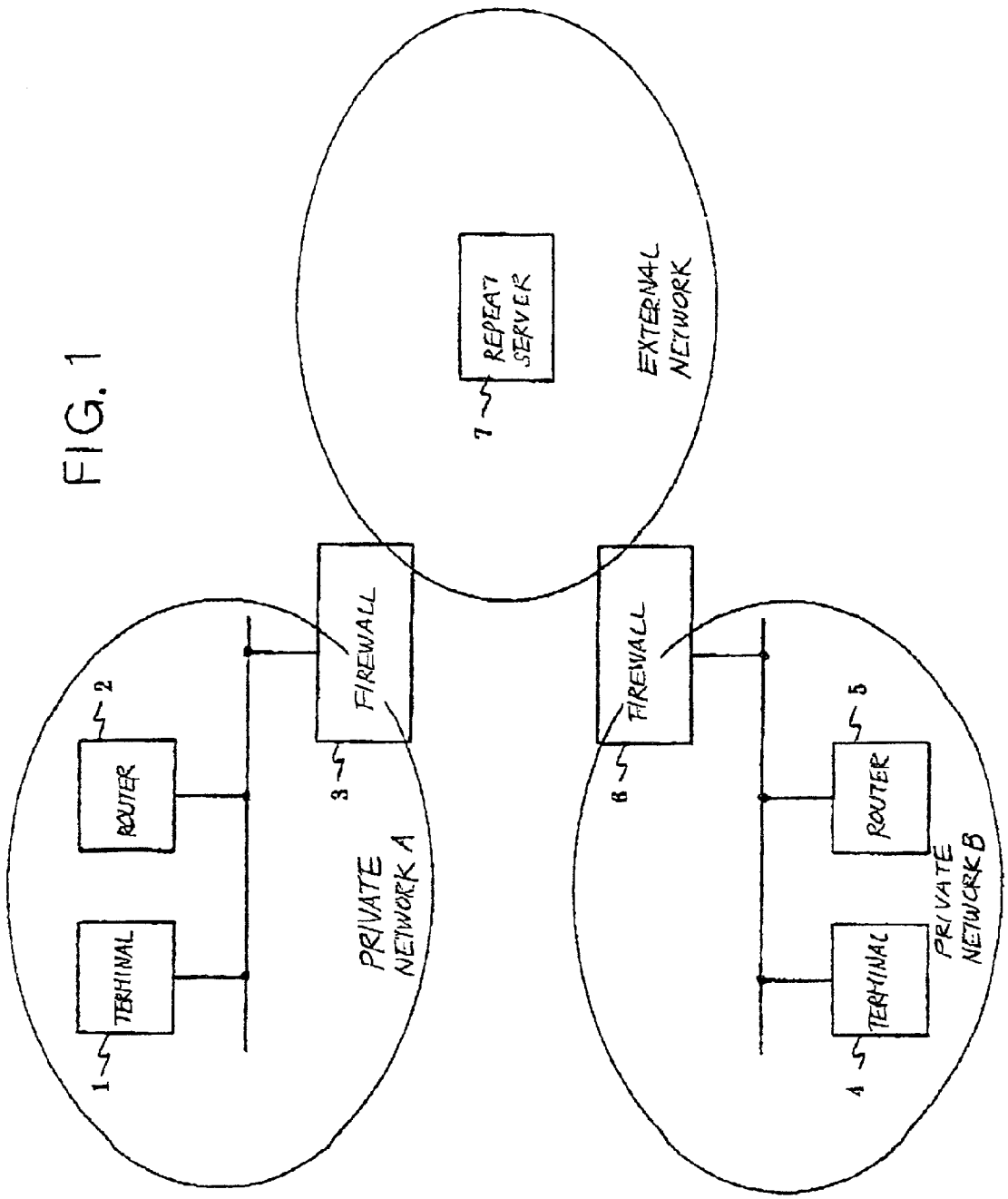
FIG. 1 is a schematic block diagram showing a virtual network embodying the present invention.

Referring to FIG. 1 of the drawings, a virtual network embodying the present invention is shown. As shown, the virtual network is generally made up of two private networks A and B and an external network C by way of example. The private networks A and B are conventional networks and include a terminal 1 and a router 2 and a terminal 4 and a router 5, respectively. The private networks A and B are connected to the external network C via firewalls 3 and 6, respectively. The external network C includes a repeat server 7. The firewalls 3 and 6 can be connected only to the repeat server 7 of the external network C. The terminals 1 and 4 installed in the private networks A and B, respectively, have heretofore been unable to communicate with each other.

Figure 2:
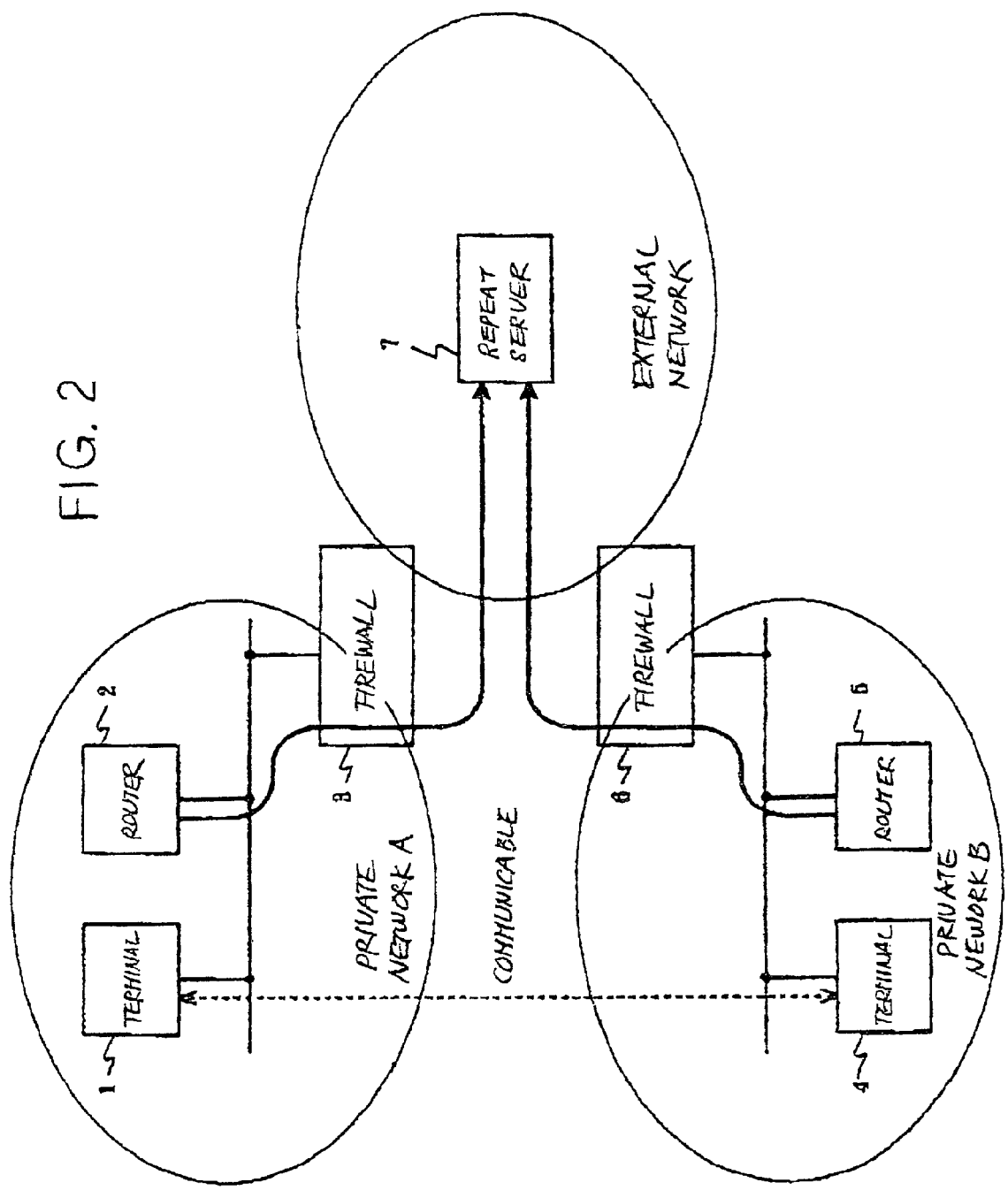
FIG. 2 shows the flow of IP packets to occur in the virtual network of FIG. 1.
Figure 3:
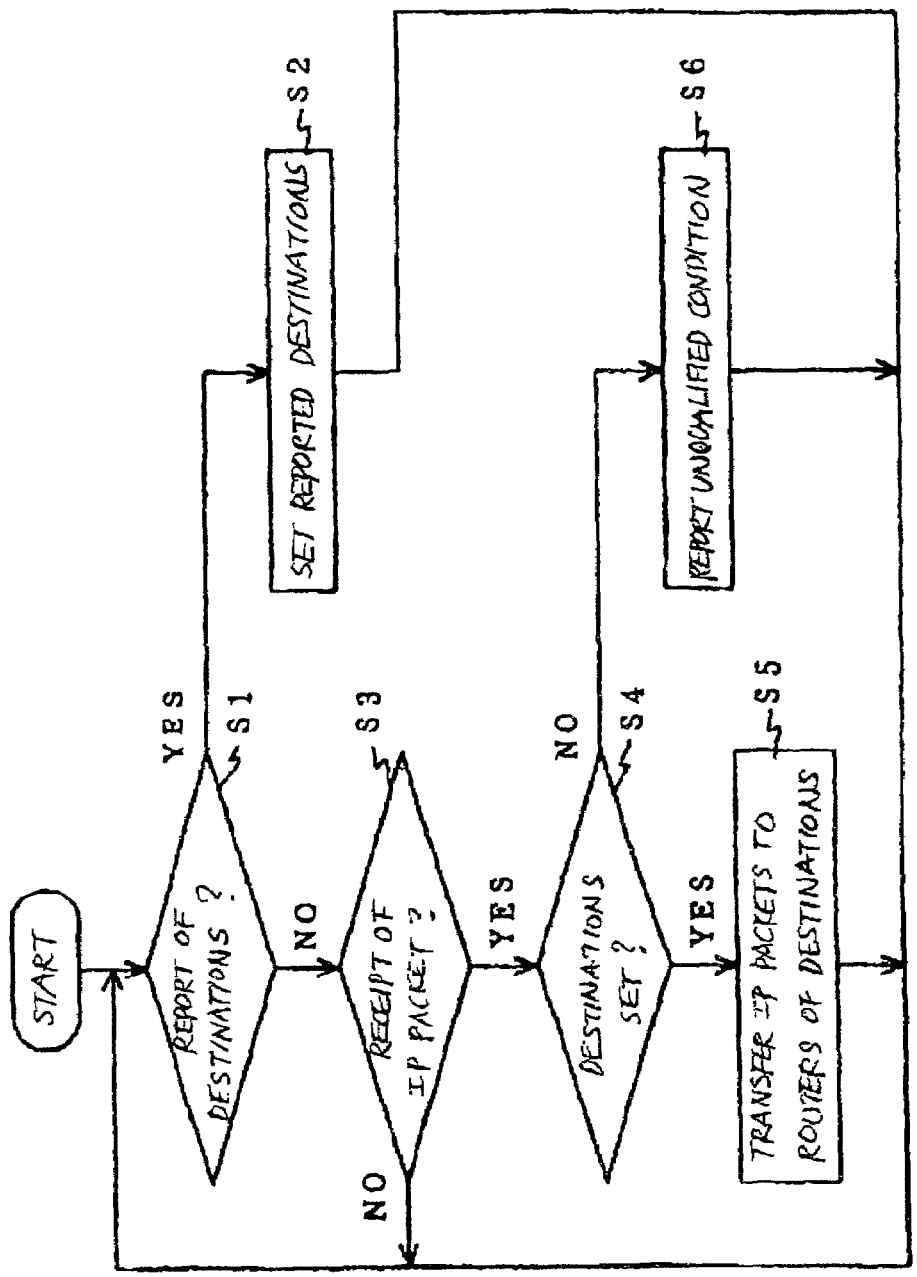
FIG. 3 is a flowchart demonstrating a specific operation of the illustrative embodiment.

FIG. 2 shows the flow of IP (Internet Protocol) packets to occur in the virtual network of FIG. 1. FIG. 3 demonstrates a specific operation of the repeat server 7, FIG. 1. A specific operation of the illustrative embodiment will be described with reference to FIGS. 1 through 3.

As shown, the router 2 of the private network A is connected to the repeat server 7 via the firewall 3. Likewise, the router 5 of the private network 8 is connected to the repeat server 7 via the firewall 6. Any desired system may be used for such connection so long as it implements bidirectional data communication. For example, assume that the firewalls 3 and 6 each are implemented as a proxy server that supports HTTP (Hyper Text Transfer Protocol) and HTTPS (Hyper Text Transfer Protocol Security). Then, use is made of a single HTTPS connection, or two HTTP connections, one for transmission and the other for receipt.

The routers 2 and 5 report the destinations of data (IP packets) to the repeat server 7 beforehand (steps S1 and S2. FIG. 3). The repeat server 7 repeats data received from the router 2 to the router 5 and repeats data received from the router 5 to the router 2 in accordance with the reported destinations (steps S3 through S5, FIG. 3). Assume that the repeat server 7 is not informed of the destinations of data to be sent from the routers 2 and 5 (NO, step S3) and therefore has not set any destination (NO, step S4). Then, the repeat server 7 informs the router 2 or 5 sent data to the server 7 of the unqualified condition of the router 2 or 5 (step 6).

The virtual network is constructed such that the terminal 1 sends IP packets meant for the terminal 4 to the router 2 while the router 2 sends them to the router 5. Also, the virtual network is constructed such that the terminal 4 sends IP packets meant for the terminal 1 to the router 5 while the router 5 sends them to the terminal 1. The terminals 1 and 4 can therefore interchange IP packets with each other despite that the firewalls 3 and 6 are allowed to be connected only to the repeat server 7.

Some of conventional firewalls buffer IP packets. In light of this, the routers 2 and 5 each monitor a non-communication time and send data to the associated firewall 3 or 6 for forcing out IP packets buffered by the firewall 3 or 6.

As stated above, the illustrative embodiment is capable of connecting the private networks A and B, which cannot directly interchange IP packets due to, e.g., the firewalls 3 and 6.

In summary, it will be seen that the present invention provides a system that connects existing private networks at low cost to thereby allow a virtual network to be easily constructed.

Various modifications will become possible for those skilled in the art after receiving the teachings of the present disclosure without departing from the scope thereof.

What is claimed is:

1. A virtual network comprising:

an external network comprising a repeat server; and a first and a second private network each comprising a respective firewall that is connectable only to said repeat server;

said first and second private networks respectively further comprising a first and a second router configured to report respective destinations of data to said repeat server for interchanging data with each other;

said repeat server repeating, in accordance with the destinations reported, data received from said first router to said second router and repeating data received from said second router to said first router.

2. The virtual network as claimed in claim 1, wherein said first and second private networks further comprise a first and a second terminal, respectively, and said virtual network is configured such that,said first and second terminals send data meant for the destinations to said first and second routers, respectively, while said first and second routers send said data to said second and first routers, respectively.

3. The virtual network as claimed in claim 2, wherein said first and second terminals interchange IP (Internet Protocol) packets with each other.

4. The virtual network as claimed in claim 3, wherein said firewalls of said first and second private networks each buffer the IP packets, and said first and second routers each monitor a non-communication time and sends data to associated one of said firewalls for forcing out buffered IP packets.

5. A virtual network connection system comprising:

an external network comprising a repeat server;

a first and a second private network each comprising a respective firewall that is connectable only to said repeat server; and a first and a second router installed in said first and second private networks, respectively;

wherein said first and second routers report respective destinations of data to said repeat server for interchanging data with each other, and said repeat server repeats data received from said first router to said second router and repeats data received from said second router to said first router in accordance with the destinations of data.

6. The system as claimed in claim 5, wherein said first and second private networks further comprise a first and a second terminal, respectively, and said virtual network is configured such that said first and second terminals send data meant for the destinations to said first and second routers, respectively, while said first and second routers send said data to said second and first routers, respectively.

7. The system as claimed in claim 6, wherein said first and second terminals interchange IP (Internet Protocol) packets with each other.

8. The system as claimed in claim 7, wherein said firewalls of said first and second private networks each buffer the IP packets, and said first and second routers each monitor a non-communication time and sends data to associated one of said firewalls for forcing out buffered IP packets.

* * * * *